US011281337B1

(12) United States Patent
Ben Himane et al.

(10) Patent No.: US 11,281,337 B1
(45) Date of Patent: Mar. 22, 2022

(54) MIRROR ACCESSORY FOR CAMERA BASED TOUCH DETECTION

(71) Applicant: Apple Inc., Cupertino, CA (US)

(72) Inventors: Mohamed Selim Ben Himane, Milpitas, CA (US); Lejing Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/021,448

(22) Filed: Sep. 15, 2020

Related U.S. Application Data

(60) Provisional application No. 62/905,069, filed on Sep. 24, 2019.

(51) Int. Cl.
 *G06F 3/042* (2006.01)
 *G06T 7/73* (2017.01)

(52) U.S. Cl.
 CPC ............. *G06F 3/0425* (2013.01); *G06T 7/73* (2017.01); *G06T 2207/20221* (2013.01); *G06T 2207/30204* (2013.01)

(58) Field of Classification Search
 CPC . G06F 2203/04101; G06F 2203/04104; G06F 2203/04808; G06F 3/04166; G06F 3/0418; G06F 3/042; G06F 3/0421; G06F 3/0425; G06F 3/04845
 See application file for complete search history.

(56) References Cited

U.S. PATENT DOCUMENTS

| 8,508,508 | B2 | 8/2013 | David | |
|---|---|---|---|---|
| 9,176,627 | B2 | 11/2015 | Morrison | |
| 9,195,344 | B2 | 11/2015 | Goertz | |
| 2011/0199335 | A1* | 8/2011 | Li | G06F 3/0428 345/175 |
| 2011/0205186 | A1* | 8/2011 | Newton | G06F 3/017 345/175 |

OTHER PUBLICATIONS

Walker, Geoff, "Camera-Based Optical Touch Technology," Information Display, 27(3), Mar. 2011.

* cited by examiner

*Primary Examiner* — Insa Sadio
(74) *Attorney, Agent, or Firm* — Blank Rome LLP

(57) ABSTRACT

Touch detection using a mirror accessory may include obtaining first image data comprising a touching object and a target surface, wherein the first image data captures a scene comprising the touching object and the target surface from the viewpoint of a camera, obtaining second image data comprising the touching object and the target surface, wherein the second image data captures the touching object and the target surface as a reflection in a mirror that is separate from the target surface, determining a pose of the mirror in the scene, determining a pose of the touching object in the scene based on the first image data, the second image data, and the pose of the mirror, and estimating a touch status between the touching object and the target surface based on the determined pose of the touching object and a pose of the target surface.

20 Claims, 6 Drawing Sheets

US 11,281,337 B1

MIRROR ACCESSORY FOR CAMERA BASED TOUCH DETECTION

BACKGROUND

This disclosure relates generally to the field of touch detection, and more specifically to a mirror accessory for touch detection.

Today's electronic devices provide users with many ways to interact with the world around them. For example, users may interact with electronic devices using virtual or physical keyboards, mice, trackballs, joysticks, touch screens, and the like. One way that users often interact with digital information on their device is through a touch screen interface. Touch screen interfaces allow a user to interact with a display surface using a finger, stylus, or other object. A touch sensor recognizes the area touched and provides a response to a user.

With the rise of mixed reality environments, users often provide input by additional means in order to enable virtual objects to interact with real objects. As an example, a user may touch a real object in order to interact with the real object in a mixed reality manner. However, real objects often do not include touch sensors which are traditionally utilized to detect touch from a user. Although cameras can be used for visual touch detection, often a camera cannot provide sufficient image data for an accurate touch detection.

SUMMARY

In one embodiment, a method for touch detection is described. The method may include obtaining first image data comprising a touching object and a target surface, where the first image data is captured from a first viewpoint. Second image data is also captured and includes the touching object and the target surface, but the second image data is captured as a reflection in a mirror that is separate from the target surface. The method also includes determining a pose of the mirror and oppose of the touching object in the scene based on a pose of the mirror, along with the first image data and the second image data. Then a touch status between the touching object in the target surface may be estimated based on the determined pose of the touching object in the pose of the target surface.

In another embodiment, the method may be embodied in computer executable program code and stored in a non-transitory storage device. In yet another embodiment, the method may be implemented in an electronic device.

DETAILED DESCRIPTION

Figure 1:
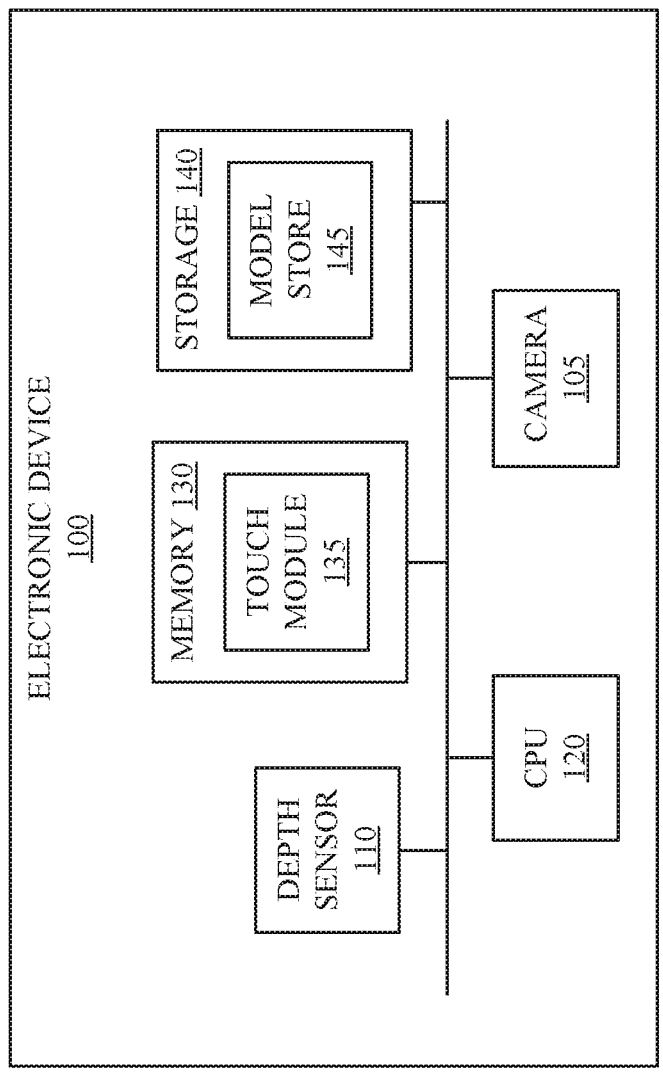
FIG. 1 shows, in block diagram form, a simplified system diagram according to one or more embodiments.

This disclosure is directed to systems, methods, and computer readable media for detecting touch in a physical environment. By utilizing a camera accessory, additional data may be obtained to better estimate whether a touch has occurred. In one or more embodiment, a first and second image of a touching object (such as a finger) and a target surface may be obtained, were the first images capturing the objects directly and the second image is capturing the objects as a reflection in a mirror. As another example, a single image may capture the touching object and the target surface both directly and as a reflection in a mirror. That is, one portion of the image may include the touching object and the surface, and another portion of the image may include the touching object and the surface is a reflection in the mirror. Estimating whether a touch is occurred may require determining a pose of the touching object, which may be based on the first and/or second image, if more than one image is used. In the situation where the touching object and/or the target surface is captured as a reflection in the mirror, a pose of the mirror may be determined. The pose of the touching object and/or the target surface may therefore also be determined in relationship to the pose of the mirror. As such, the touch status may be estimated based on the determined pose of the touch touching object in the pose of the target surface. Having the perspective of the touching object and the target surface from two or more perspectives (e.g., the perspective from the camera, and the perspective as a reflection in the mirror) may alleviate occlusion that may occur between the camera, the touching object, the target surface, and/or other components within the environment. As such, the two perspectives may improve observability, visibility, and/or ambiguity of a touch event, thus improving estimation of whether a touch has occurred.

In one embodiment, a frame of the mirror may have a marker, such as a border or other identifiable feature. In this situation, the marker or other identifiable feature may be used to identify the mirror (and, thus, a mirror region of an image) and determine the pose of the mirror. For example, by comparing the locations of one or more markers, a location and/or orientation of the mirror may be determined. That is, a relative location of two or more markers may be used to determine a distance from the camera at which the mirror is located, the relative locations of the markers in 3D space may be used to determine a rotation of the mirror, a size of one or more of the markers in the image of the mirror may be compared to a known size of the marker to determine a distance of the mirror from the camera, and the like. In another embodiment, a camera system may utilize edge detection to detect the mirror's known geometry in a scene. For example, the geometry of the mirror may be known such that a detected object in the scene of the same geometry will be determined to be the mirror. Then, the reflected portion of the image may be identified. In one embodiment, the mirror may be part of a controller system such that determination that the controller system is placed on a surface indicates that the user will use the surface and, thus, the surface should be monitored for detected touch.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow chart or flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "camera system" refers to one or more lens assemblies along with the one or more sensor elements and other circuitry utilized to capture an image. For purposes of this disclosure, the "camera" may include more than one camera system, such as a stereo camera system, multi-camera system, or a camera system capable of sensing the depth of the captured scene.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Referring to FIG. 1, a simplified block diagram of an electronic device 100 is depicted, in accordance with one or more embodiments of the disclosure. Electronic device 100 may be part of the multifunctional device, such as phone, tablet computer, personal digital assistant, portable music/ video player, wearable device, base station, laptop computer, desktop computer, network device, or any other electronic device. FIG. 1 shows, in block diagram form, and overall view of a system diagram for a system capable of providing touch detection using visual means. Although not shown, electronic device 100 may be connected to additional devices capable of providing similar or additional functionality across the network, a wired connection, Bluetooth or other short range connection, among others, as will be described below with respect to FIG. 2.

Electronic device 100 may include a processor or processors, such as processing unit (CPU) 120. Processor 120 may be a system-on-chip such as those found in mobile devices and include one or more dedicated graphics processing units (GPUs). Further, processor 120 may include multiple processors of the same or different type. Electronic device 100 may also include a memory 130. Memory 130 may include one or more different types of memories, which may be used for performing device functions in conjunction with processor 120. For example, memory 130 may include cache, ROM, RAM, or any kind of transitory or non-transitory computer readable storage medium capable of storing computer readable code. Memory 130 may store various programming modules for execution by processor 120, including touch module 135. Electronic device 100 may also include storage 140. Storage 140 may include one or more non-transitory mediums including, for example, magnetic disks (fixed, floppy, and removable) and tape, optical media such as CD-ROMs and digital video discs (DVDs), and semi-conductor memory devices such as electronically programmable read-only memory (EPROM), and electrically erasable programmable read only memory (EEPROM). Storage 140 may include model store 145, which may include models of touch objects, such as a user's finger. It should be understood that according to one or more embodiments, the touch module 135 and the model store 145 may be stored or hosted in different locations with an electronic device 100. Further, in one more embodiments, the touch module 135 and model store 145 may be stored in alternative or additional locations, as will be described below with respect to FIG. 2.

In one or more embodiments, the electronic device 100 may include other components utilized for vision-based touch detection, such as one or more cameras 105 and/or other sensors such as depth sensor 110. In one or more embodiments, each of the one or more cameras 105 may be a traditional RGB camera, a depth camera, or the like. Further, cameras 105 may include a stereo or other multi camera system, a time-of-flight camera system, or the like which capture images from which depth information of the scene may be determined.

In one or more embodiments, electronic device 100 may allow a user to interact with CGR environments. There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/ laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes.

In one or more embodiments, touch module 135 may estimate whether a touch has occurred (e.g., contact has been made) between a touching object and a target surface. The touch module 135 may determine the likelihood that contact has been made between a touching object (such as a finger or fingertip) and a target surface. The touch module 135 may determine when a touch event occurs, for example, by obtaining depth information for a touching object in the surface as an example, the touch module 135 may receive or obtain depth information from the camera 105, the depth sensor 110, or other sensors. Further, the touch module 135 may determine touch information (such as by generating a depth map) from other data, such as stereo images captured by camera(s) 105, and the like. The touch module 135 may then determine, based on the signal, and estimation that a touch event has occurred. In one or more embodiments, the estimation may be based on a number of factors, such as by utilizing a predetermined model of a finger or other touching object (such as from a model store 145). In one or more embodiments, touch module 135 may also estimate the distance between a touching object and a target surface. According to one or more embodiments, raw touch data may indicate a likelihood that a touch has occurred based on, for example, a determined measured distance between the touching object and the target surface. A touch may be determined to have occurred, for example, based on a predetermined or dynamically determined threshold estimation value for determining a touch.

In one or more embodiments, touch module 135 may obtain depth information based on visual information obtained from camera(s) 105 capturing image data for the potential touch from at least two views: directly from the view of one or more of the cameras, and as image data capturing a reflection in a mirror of the potential touch. For example, a mirror accessory may be placed in the environment opposite of the touching object from the camera 105. As such, the camera(s) 105 may capture image data that show a touching object on the target surface from multiple viewpoints. The touch module 135 may utilize known information about the touching object. For example, the touch module 135 may use the image data captured from the point of view of the camera to supplement the image data capture is a reflection in the mirror.

According to one or more embodiments, capturing the reflected image data may include identifying the mirror in the scene. As will be described below with respect to FIG. 2, in one or more embodiments the mirror may be part of a device that provides a transmission indicating that the mirror has been placed on a target surface. Further, in one or more embodiments, the mirror may be associated with a known geometry, which may be stored, for example, in model store 145. As such, image data captured by the camera 105 may be analyzed object detection in order to identify the mirror in the scene. As another example, edge detection may be utilized to identify the known geometry of the mirror. As yet another example, the mirror may contain a marker, such as a border or other identifiable feature, which may be utilized to identify the mirror in the scene.

Upon capturing the image data that includes the reflected touching object and target surface, touch module 135 may "fuse" the first image data (e.g., the image data depicting touching object on the surface from the point of view of the camera), and the second image data (e.g., the image data depicting the touching object and the surface as a reflection in the mirror). In one or more embodiments, fusing the first image data and the second image data may include determining 3D information for the touching object based on a 3D model of the touching object and the target surface to estimate whether the touching object is touching the target surface. Accordingly, the touch module 135 may utilize a model of the touching object and/or the target surface in order to use the first image data and the second image data.

Although electronic device 100 is depicted as comprising the numerous components described above, and one or more embodiments, the various components may be distributed across multiple devices. Particularly, in one or more embodiments, one or more of the touch module 135 and model store 145 may be disputed differently across the electronic device 100 or elsewhere in additional systems which may communicatively coupled to the electronic device 100. Further, in one or more embodiments, electronic device 100 may be comprised of multiple devices in the form of an electronic system. Accordingly, although certain calls and transmissions are described herein with respect to the particular systems as depicted. In one or more embodiments, the various calls and transmissions may be differently directed based on the differently distributed functionality. Further, additional components may be used, or some combination of the functionality of any of the components may be combined.

Figure 2:
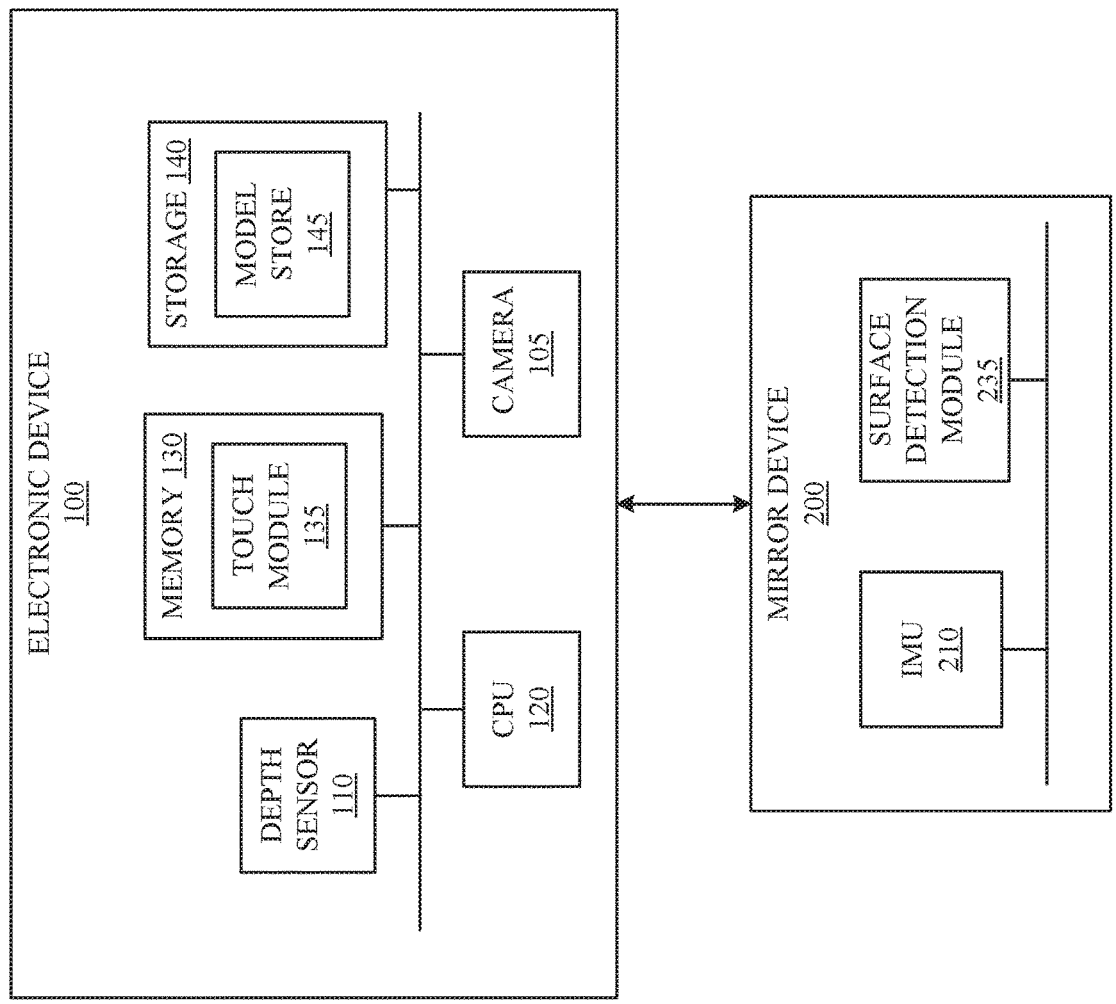
FIG. 2 shows, in block diagram form, an alternate simplified system diagram including a mirror device, according to one or more embodiments.

Turning to FIG. 2, an example system diagram is presented in which the electronic device 100 is communicable coupled to a mirror device 200. As described above, electronic device 100 may include a memory 130 and a storage 140. Further, the electronic device may include a depth sensor 110, a processor 120, and a camera 105 which may be similar to those components described above with respect to FIG. 1. As described above, the touch module 135 may analyze image data captured by the camera 105 and/or depth information captured by depth sensor 110 of a touching object and a target surface in order to estimate whether a touch has occurred between the touching object and the target surface. Further, in one or more embodiments, the touch module 135 may utilize model store 145 to identify and utilize models of the touching object and/or the target surface in order to estimate whether a touch has occurred.

In one or more embodiments, mirror device 200 may include a device that provides an indication or transmission to indicate that the mirror device 200 is in an environment with the target surface and the touching object. As an example, mirror device 200 may include inertial measurement unit (IMU) 210 which may be used due to detect placement of the mirror device 200. As an example, IMU 210 may be a sensor that detects a sudden change in acceleration. As such, IMU 210 may include an accelerometer, the gyroscope, and the like. In one or more embodiments, surface detection module 235 may transmit an indication to electronic device 100 when the mirror device 200 has been placed on a target surface, according to IMU 210. Surface detection module 235 may include computer code executable by a processor within mirror device 200. According to embodiments, surface detection module 235 may be provided in a system-on-chip format.

Figure 3:
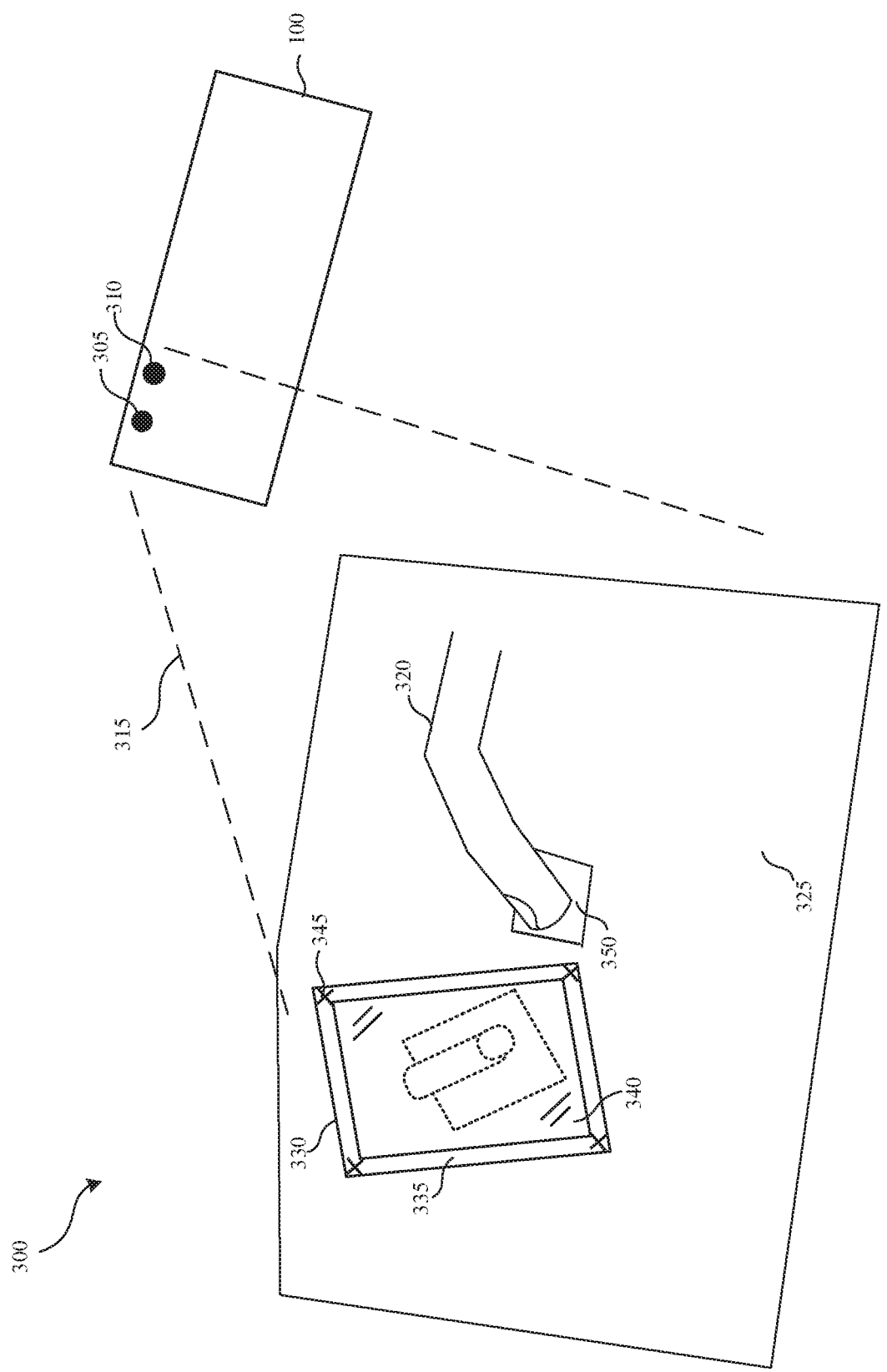
FIG. 3 shows an example system setup for determining touch detection using a mirror accessory, according to one or more embodiments.

FIG. 3 shows an example system setup 300 in which touch may be detected, according to one or more embodiments. The system setup 300 includes electronic device 100. Shown in the electronic device 100 are camera 305 and/or depth sensor 310. In one or more embodiments, the electronic device 100 captures an image of an environment that includes a target surface 325 and a touching object 320 as an example, which may be captured by camera 305. In order to determine the likelihood of a touch between the touching object 320 and the target surface 325, the touching object 320 and the target surface 325 may be captured within the field of view 315 of the camera 305. In one or more embodiments, the target surface 325 may be any kind of surface on which touch may be detected, and may not be equipped with a touch detection sensor. The surface 325 may be a flat surface, or maybe a curved or irregular surface. According to one or more embodiments, a model of the surface may be registered with the electronic device 100 such as within model store 145, such the likelihood that a touch has occurred may be determined based on depth or visual information. In alternative embodiments, the electronic device 100 may determine the likelihood of a touch between the touching object 320 and the target surface 325 without relying on the model of the touching object.

In one or more embodiments, electronic device 100 may capture the first image data that includes the touching object 320 and the target surface 325, as well as second image data that includes the reflection 340 of the touching object 320 and the target surface 325, as it is reflected in mirror accessory device 330. Then, electronic device 100 may utilize a stored model of touching object 320, such as a predefined model stored in model store 145, such that depth information of the touching object 320 and the target surface 325 may be determined in order to estimate whether a touch has occurred. Further, the electronic device 100 may also utilize the image data that includes the reflection 340 to supplement the first image data, and better determine whether a touch has occurred. For example, the image data that includes the reflection 340 may be utilized to provide additional visual information to provide a better fit to a model of the touching object from the model store 145. As an example, the first image data and the second image data may be used to provide a more accurate determination of the depth information for example of the fingertip of touching object 320. In addition, the visual information may be utilized to determine particular touch region 350 within the target surface 325 on which the touch is estimated to have occurred (or have not occurred).

According to one or more embodiments, the mirror accessory device 330 may be part of the controller system such that a determination that the mirror accessory device 330 is placed on the surface indicates that the user will use the surface as a touch surface and, thus, the surface should be monitored for detected touch. As described above with respect to FIG. 2, the mirror accessory device 330 may include an IMU 210 or other sensor which may provide a signal that may indicate that the mirror has been placed on the surface 325. As such, in response to a detected placement of the mirror accessory device 330, the surface detection module 235 may transmit an indication to the electronic device 100 that the user will use the surface on which the mirror accessory has been placed. Accordingly, in one or more embodiments, the placement of the mirror accessory may trigger a detection mode in which touch module 135 of electronic device 100 monitors the touching object 320 detect a touch on target surface 325.

As described above with respect to FIG. 1, the electronic device 100 may utilize mirror accessory device 330 without the use of an IMU 210 or other sensor providing an indication that the mirror accessory 330 has been placed on the surface 325. As an example, in the mirror accessory device 330 may include markers 345, for example on frame 335 of the mirror accessory device 330, which may indicate to the electronic device 100 where a mirror portion of the scene is located. In one or more embodiments, a single camera 305 may capture a single scene that includes the first image data (e.g., that includes a direct view of the touching object 320 and the target surface 325), as well as second image data (e.g., that includes the reflection 340 of the touching object 320 and the target surface 325). Alternatively, the first camera may capture the first image data that includes a direct view of the touching object 320 and the target surface 325, while a second camera may capture the second image data that includes the reflection of the touching object 320 and the target surface 325.

Figure 4:
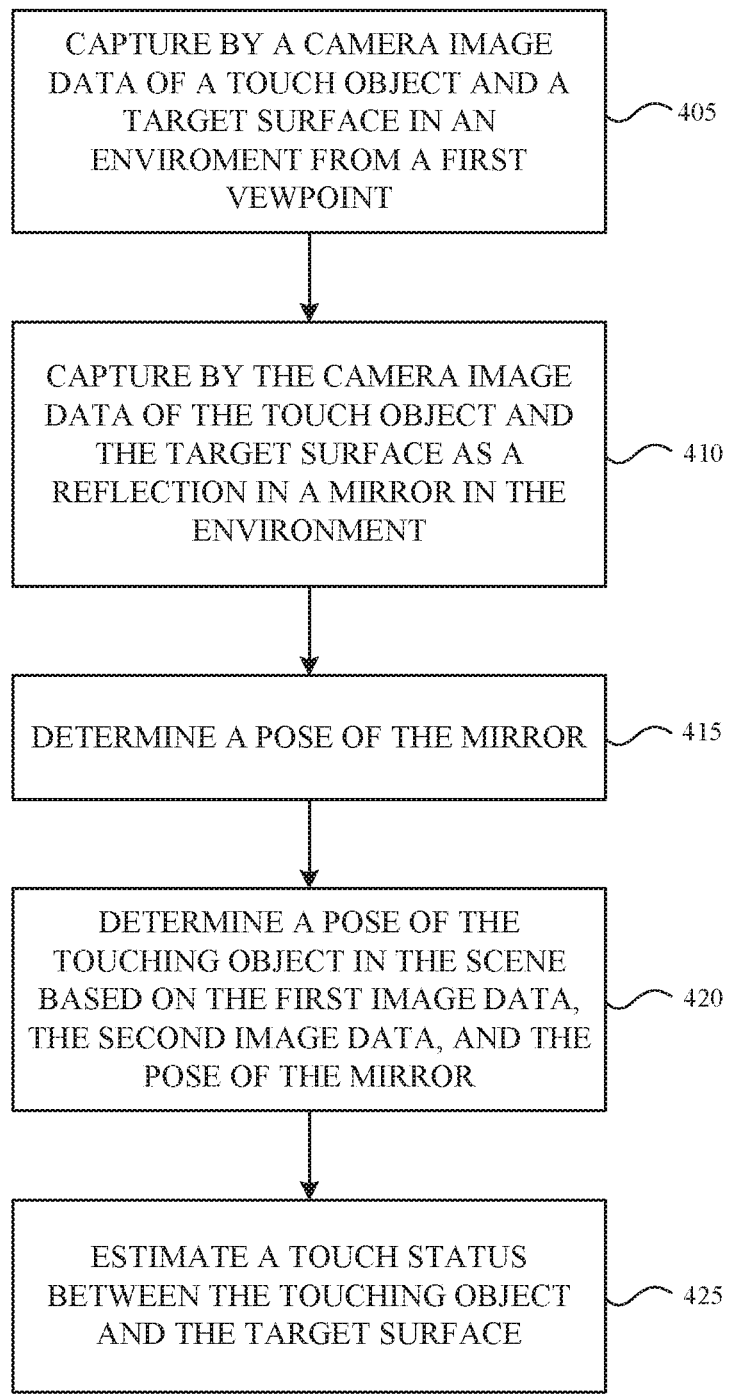
FIG. 4 shows, flow chart form, an example technique for detecting a touch using a mirror accessory, in accordance with one or more embodiments.

FIG. 4 shows, and flowchart form, an example technique for estimating a touch status between a touching object and target surface, in accordance with one or more embodiments. For purposes of explanation, the following steps will be described in the context of FIG. 1. However, it should be understood that the various actions may be performed by alternate components. In addition, the various actions in a different order. Further, some actions may be performed simultaneously and some may not be required, or others may be added.

The flowchart begins at 405 where electronic device 100 captures by camera 105 image data the touching object and a target surface in an environment from the first viewpoint. More specifically, electronic device 100 captures an image of a touching object and a target surface from the perspective of the first camera. As such, the first image data of the touching object on the target surface are captured directly from the camera. The flowchart continues at 410, where the electronic device 100 captures by the camera image data of the touching object and the target surface as a reflection in the mirror accessory device in the environment. As described above, the first image data and the second image data may be captured as part of a single image, for example, captured by a single camera. Alternatively, or additionally, the first image data and the second image data may be captured by different cameras of electronic device 100. Moreover, the first image data and/or the second image data may be obtained by electronic device 100 by camera devices that are communicatively coupled to electronic device 100.

At 415, the touch module 135 determines a pose of the mirror. As described above, the pose of the mirror may be determined based on a known geometry of the mirror, for example a known geometry that is stored in model store 145 of electronic device 100. That is, mirror device may be detected in the environment using any detection technique. For example, the mirror may use edge detection to identify the known geometry of the mirror. As another example, mirror device may include targets, markers, or other identifiable features, which may be identified in an image to determine reflected portion of the image by the mirror. In one or more embodiments, the pose of the mirror may be determined in a predefined coordinate system. As an example, the pose of the mirror may be determined in a coordinate system of the camera or a coordinate system of the environment. Further, in one or more embodiments, the pose of the mirror may be described with 6 degrees of freedom, including a 3D rotation and a 3D translation. The markers, or other identifiable features, may be rigidly attached to the mirror, such as on a frame of the mirror, attached to the mirror, or on the surface of the mirror. The markers, or other identifiable features, may be utilized to determine the pose of the mirror with respect to the camera, or to the surrounding environment.

As described above, in one or more embodiments, the mirror device may be part of a controller system that includes an IMU or other sensor which detects a change in acceleration of the mirror accessory device. As such, mirror accessory device may detect when the device is set on the surface, and the placement of the mirror device, such as the location of the placement and/or the action of the placement, maybe utilize to determine a mirror region in the image (e.g., second image data).

The flowchart continues at 420 where the touch module 135 determines a pose of the touching object in the scene. The pose of the touching object in the scene may be determined based on the first image data, the second image data, and the pose of the mirror accessory device. In one or more embodiments, the pose of the touching object may be determined by using the first image data and the second image data and comparing the fused image to a model of the touching object, for example a model stored in model store 145. Further, in one or more embodiments, the pose of the touching object may be determined in a predefined coordinate system. As an example, the pose of the touching object may be determined in a coordinate system of the camera or a coordinate system of the environment. Further, in one or more embodiments, the pose of the touching object may be determined with 6 degrees of freedom, including a 3D rotation and a 3D translation.

The flowchart concludes at 425, where the touch module 135 estimates the touch status between the touching object and the target surface. In one or more embodiments, the touch module 135 may determine a depth of the touching object along with the depth of the target surface over which the touching object is hovering in order to determine whether a touch has occurred. As such, a touch may or may not have occurred, and the first image data and the second image data may simply be capturing the touching object hovering over the target surface. In one or more embodiments, depth images of the fingertip (or other touching object) may be captured. The touch module 135 may detect a position of the touching object in a depth image and determine touch data for the touching object based on a finger patch (for example, a portion of the image depicting the tip of the finger) containing depth pixels around the detected position. In one or more embodiments, the surface may be determined based on RANSAC plane estimation, and estimating a distance to the determined plane for each pixel in the finger patch. Then, distance regression may be performed to predict a hover distance. Alternatively, binary classification may be performed to a touch status based on the likelihood of a touch based on the finger patch of distances to determine plane. In one or more embodiments, the touch status may be estimated based on the determined pose of the mirror and/or the touching object. Further, the touch status may be determined in relation to the target surface. In one or more embodiments, determining the pose of the mirror and the pose of the touching object in a common coordinate system may allow the touch module 135 to determine a relative distance between the touching object and the target surface and/or other components in the environment.

Figure 5:
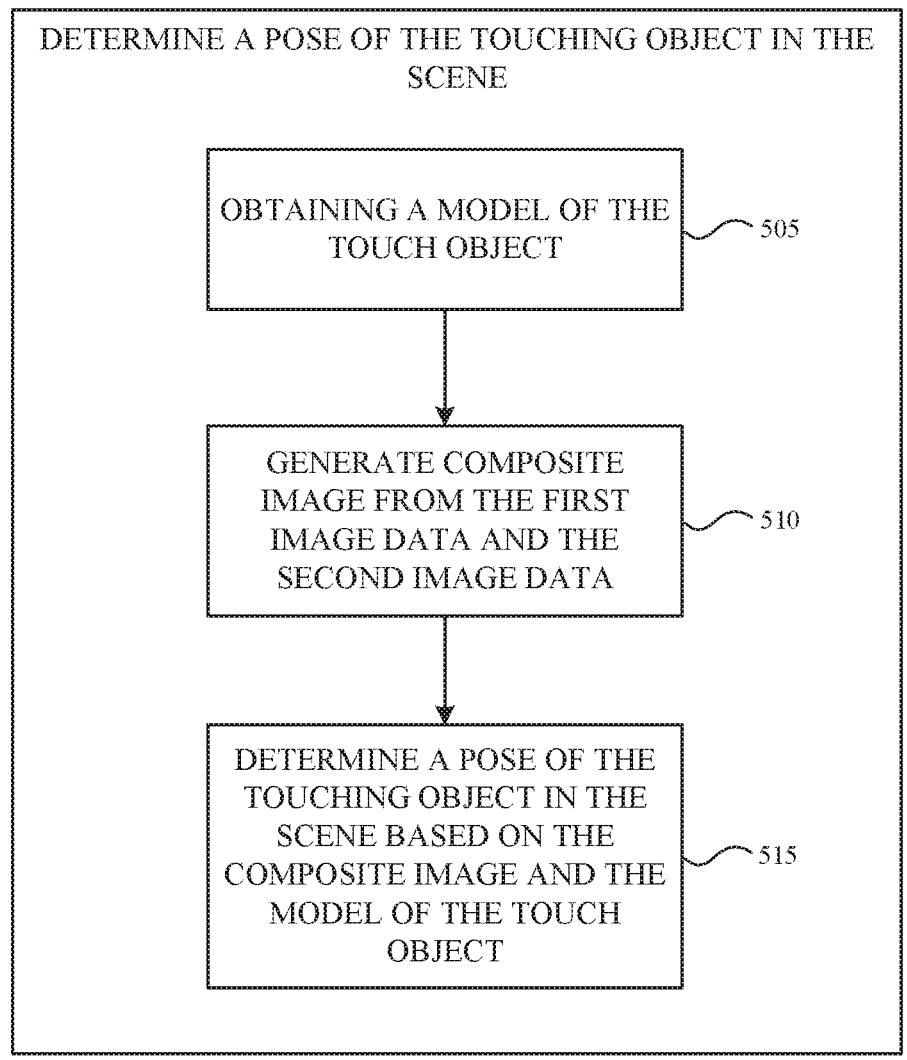
FIG. 5 shows, in flow chart form, an example technique for estimating a touch status using a mirror accessory, according to one or more embodiments.

Referring now to FIG. 5, an example technique is shown in flowchart form determining the pose of the touching object in the scene based on the first image data, the second image data, and the pose of the mirror. For purposes of explanation, the following steps will be described in context of FIG. 1. However, it should be understood that the various actions may be performed by alternative components. Further, the various processes may be performed in a different order or simultaneously, and in one or more embodiments, one or more of the processes may be omitted, or others may be added.

The flowchart begins at 505 where the touch module 135 obtains a model of the touching object as described above, a model may be predefined, and may be stored in model store 145 within electronic device 100, or elsewhere in storage communicatively coupled to the electronic device 100. In one or more embodiments, the model may be customized to particular user of electronic device 100, or maybe the general model, for example of a finger/fingertip.

The flowchart continues at 510, where the touch module 135 generates a composite image from the first image data and the second image data. As described above, the composite image may be generated by fusing the first image data that includes the touching object from the first perspective, with the second image data that includes the touching object from a second perspective (e.g., as a reflection in a mirror). In one or more embodiments, the first image data and the second image data may be fused according to model of the touching object attained from model store 145.

The flowchart concludes at 515, where the touch module determines a pose of the touching object in the scene based on the composite image and the model of the touching object. For example, a depth of a fingertip may be determined by comparing composite image data to find model from the model store 145. According to one or more embodiments, the pose of the touching object may be determined, for example, in relation to the target surface, in relation to the mirror, in relation to the electronic device, or the like. Further, in one or more embodiments, the pose of the touching object may be determined, for example, based on a coordinate system of the electronic device, a real world coordinate system, a coordinate system of the target surface, or the like.

In one or more embodiments, depth information of the surface may similarly, for example using a model of the surface, or depth information for the surface captured in association with the first image data and/or the second image data. As such, a gap distance between the touching object and the target surface calculated based on a determine depth of the fingertip or other touching object as compared to the target surface over which the touching object is located. In one or more embodiments, the gap distance may be utilized to estimate the likelihood of a touch, or otherwise make a determination as to whether a touch has occurred.

Figure 6:
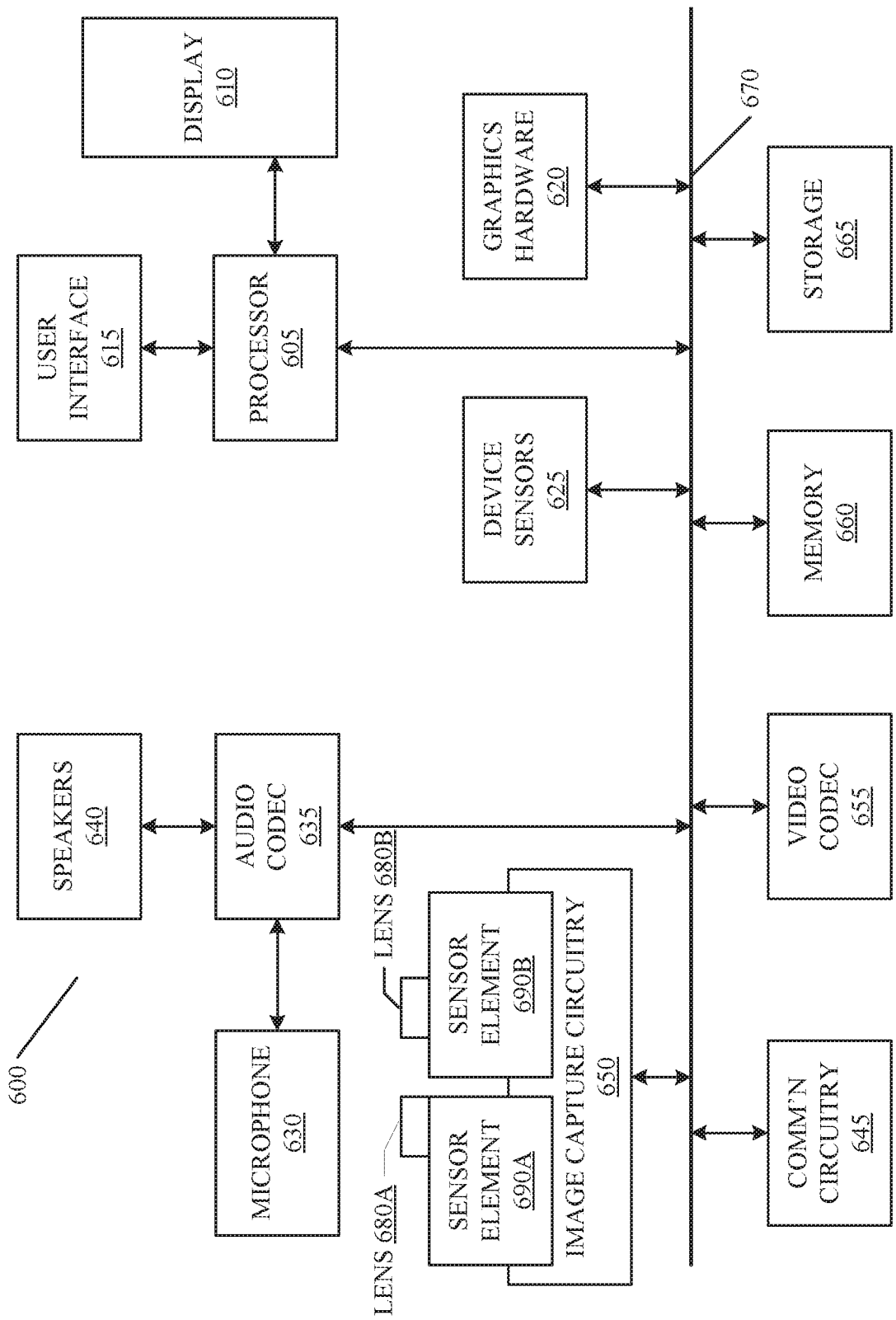
FIG. 6 shows, in block diagram form, a simplified multifunctional device according to one or more embodiments.

Referring now to FIG. 6, a simplified functional block diagram of illustrative multifunction electronic device 600 is shown according to one embodiment. Each of electronic device 100, and mirror device 200 may be a multifunctional electronic device, or may have some or all of the described components of a multifunctional electronic device described herein. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650 (e.g., including camera system) video codec(s) 655 (e.g., in support of digital image capture unit), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include two (or more) lens assemblies 680A and 680B, where each lens assembly may have a separate focal length. For example, lens assembly 680A may have a short focal length relative to the focal length of lens assembly 680B. Each lens assembly may have a separate associated sensor element 690. Alternatively, two or more lens assemblies may share a common sensor element. Image capture circuitry 650 may capture still and/or video images. Output from image capture circuitry 650 may be processed, at least in part, by video codec(s) 655 and/or processor 605 and/or graphics hardware 620, and/or a dedicated image processing unit or pipeline incorporated within circuitry 650. Images so captured may be stored in memory 660 and/or storage 665.

Sensor and camera circuitry 650 may capture still and video images that may be processed in accordance with this disclosure, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for estimating a touch, comprising:
   obtaining, from a camera, image data comprising a touching object, a target surface, and a mirror in a scene, wherein the image data comprises a first representation of the touching object and the target surface as a reflection in the mirror;
   determining a spatial relationship between the touching object and the target surface based on the first representation of the touching object and the target surface in the image data; and
   estimating a touch status between the touching object and the target surface based on the determined spatial relationship between the touching object and the target surface.

2. The method of claim 1, further comprising:
   obtaining a model of the touching object,
   wherein determining the spatial relationship between the touching object and the target surface in the scene is further based on the model of the touching object.

3. The method of claim 1, further comprising determining a pose of the mirror in the scene based on a detected feature of the mirror in the image data.

4. The method of claim 3, wherein the detected feature comprises a detected geometry.

5. The method of claim 3, wherein the detected feature comprises a marker.

6. The method of claim 1, wherein the image data further comprises a second representation of the touching object and target surface outside the mirror, and wherein estimating the touch status comprises:
   fusing the first representation and the second representation to obtain a third representation; and
   estimating the touch status based on the third representation.

7. The method of claim 1, wherein the image data comprises a depth image.

8. A non-transitory computer readable medium comprising computer readable code for estimating a touch, the computer readable code executable by one or more processors to:
   obtain, from a camera, image data comprising a touching object, a target surface, and a mirror in a scene, wherein the image data comprises a first representation of the touching object and the target surface as a reflection in the mirror;
   determine a spatial relationship between the touching object and the target surface based on the first representation of the touching object and the target surface in the image data; and
   estimate a touch status between the touching object and the target surface based on the determined spatial relationship between the touching object and the target surface.

9. The non-transitory computer readable medium of claim 8, further comprising computer readable code to:
   obtain a model of the touching object,
   wherein determining the spatial relationship between the touching object and the target surface in the scene is further based on the model of the touching object.

10. The non-transitory computer readable medium of claim 8, further comprising computer readable code to determine a pose of the mirror in the scene based on a detected feature of the mirror in the image data.

11. The non-transitory computer readable medium of claim 8, wherein the image data further comprises a second representation of the touching object and target surface outside the mirror, and wherein the spatial relationship between the touching object and the target surface is further determined based on the second representation of the touching object and target surface.

12. The non-transitory computer readable medium of claim 11, wherein the computer readable code to estimate the touch status comprises:
   fuse the first representation and the second representation to obtain a third representation; and
   estimate the touch status based on the third representation.

13. The non-transitory computer readable medium of claim 11, wherein the first representation and the second representation are comprised in a single image captured by the camera.

14. The non-transitory computer readable medium of claim 11, wherein the first representation and the second representation are obtained from the camera and a second camera.

15. A system for estimating a touch, comprising:
   one or more cameras;
   one or more processors;
   one or more computer readable media comprising computer readable code executable by the one or more processors to:
      obtain, by the one or more cameras, image data comprising a touching object, a target surface, and a mirror in a scene, wherein the image data comprises a first representation of the touching object and the target surface as a reflection in the mirror;
determine determining a spatial relationship between the touching object and the target surface based on the first representation of the touching object and the target surface in the image data; and
estimate a touch status between the touching object and the target surface based on the determined spatial relationship between the touching object and the target surface.

16. The system of claim 15, further comprising computer readable code to:
obtain a model of the touching object,
wherein determining the spatial relationship between the touching object and the target surface in the scene is further based on the model of the touching object.

17. The system of claim 15, further comprising computer readable code to determine a pose of the mirror in the scene based on a detected feature of the mirror in the image data.

18. The system of claim 17, wherein the detected feature comprises a detected geometry.

19. The system of claim 17, wherein the detected feature comprises a marker.

20. The system of claim 15, wherein the image data further comprises a second representation of the touching object and target surface outside the mirror, and wherein the computer readable code to estimate the touch status comprises:
fuse the first representation and the second representation to obtain a third representation; and
estimate the touch status based on the third representation.

* * * * *